(12) United States Patent
Curticapean

(10) Patent No.: US 8,848,565 B2
(45) Date of Patent: Sep. 30, 2014

(54) METHOD FOR PERFORMING MEASUREMENTS AND POSITIONING IN A NETWORK BASED WLAN POSITIONING SYSTEM

(75) Inventor: Florean Curticapean, Tampere (FI)

(73) Assignee: QUALCOMM Incorporated, San Diego, CA (US)

( * ) Notice: Subject to any disclaimer, the term of this patent is extended or adjusted under 35 U.S.C. 154(b) by 190 days.

(21) Appl. No.: 13/547,828

(22) Filed: Jul. 12, 2012

(65) Prior Publication Data

US 2014/0016485 A1   Jan. 16, 2014

(51) Int. Cl.
    *H04L 12/26*   (2006.01)
(52) U.S. Cl.
    USPC .......................................... 370/252
(58) Field of Classification Search
    USPC .......................................... 370/252
    See application file for complete search history.

(56) References Cited

U.S. PATENT DOCUMENTS

| | | | |
|---|---|---|---|
| 5,736,964 | A | 4/1998 | Ghosh et al. |
| 5,812,528 | A | 9/1998 | Vandervort |
| 6,769,030 | B1 | 7/2004 | Bournas |
| 8,179,816 | B1 | 5/2012 | Vaidyanathan et al. |
| 2011/0250844 | A1 | 10/2011 | Gorday et al. |
| 2012/0315919 | A1* | 12/2012 | Hirsch ........................ 455/456.1 |
| 2013/0148514 | A1* | 6/2013 | Zhang et al. ................... 370/252 |
| 2013/0294266 | A1* | 11/2013 | Lim et al. ........................ 370/252 |

FOREIGN PATENT DOCUMENTS

| | | |
|---|---|---|
| WO | WO-0250563 A1 | 6/2002 |
| WO | WO 2011018751 A1 | 2/2011 |

OTHER PUBLICATIONS

International Search Report and Written Opinion—PCT/US2013/047055—ISA/EPO—Sep. 30, 2013.
U.S. Appl. No. 13/474,650, filed May 17, 2012, Palanki, et al. "Access Point Measurements for Received Signal Prediction," pp. 51.
U.S. Appl. No. 13/491,393, filed Jun. 7, 2012, Palanki, et al., "Indoor Positioning Using Joint Likelihoods," pp. 50.

* cited by examiner

*Primary Examiner* — Huy D Vu
*Assistant Examiner* — Kevin Cunningham
(74) *Attorney, Agent, or Firm* — Mahamedi Paradice LLP

(57) ABSTRACT

A network based positioning (NBP) system that improves the accuracy of wireless positioning systems by concurrently performing RTT ranging operations and associated TDOA operations to generate a number of difference measurement values from which the position of a station device (STA) can be determined using, for example, multilateration techniques. Because the RTT values and their corresponding TDOA values both include the turn-around time (TAT) of the STA, subtracting TDOA values from their corresponding RTT values generates difference measurement values that do not include such TAT values of the STA. In this manner, the STA position can be determined without estimating the STA's TAT.

17 Claims, 7 Drawing Sheets

METHOD FOR PERFORMING MEASUREMENTS AND POSITIONING IN A NETWORK BASED WLAN POSITIONING SYSTEM

TECHNICAL FIELD

The present embodiments relate generally to wireless networks, and specifically to determining the location of Wi-Fi enabled wireless devices.

BACKGROUND OF RELATED ART

The recent proliferation of Wi-Fi access points in wireless local area networks (WLANs) has made it possible for WLAN positioning systems to use the known locations of its access points (APs) to determine the position of a mobile device or station (STA), especially in areas where there is a large concentration of active Wi-Fi access points (e.g., in urban cores, shopping centers, office buildings, and so on). Typically, the APs that form a basic service set (BSS) of a WLAN are connected to a server that can instruct one or more of its APs to determine the distance between itself and the STA. Once the distances between the STA and 3 or more selected APs are determined, the server can calculate the position of the STA relative to the selected APs.

There are a number of different techniques that WLAN positioning systems can employ to determine the distances between its APs and the STA. For example, some WLAN positioning systems use the received signal strength indicator (RSSI) of signals received from the STA as a rough approximation of the distance between the STA and the AP, where a stronger RSSI means that the STA is closer to the AP and a weaker RSSI means that the STA is further from the AP. Unfortunately, RSSI ranging techniques are notoriously inaccurate, for example, because of the difficulty in modeling signal attenuations in indoor environments and because of different RSSI scales employed by various STA vendors.

As a result, many WLAN positioning systems employ round trip time (RTT) techniques to determine the distance between an AP and a STA. For such systems, a selected AP can initiate an RTT ranging operation with the STA by sending a request (REQ) frame to the STA, which in response thereto sends an acknowledgement (ACK) frame back to the AP. An RTT value can be calculated as the difference in time between the time of arrival (TOA) of the ACK frame and the time of departure (TOD) of the REQ frame, and thereafter the RTT value can be correlated to a distance between the AP and the STA. More specifically, the distance (d) between the AP and the STA can be expressed as $d=c*t_{sp}/2=c*(RTT-TAT)/2$, where c is the speed of light, $t_{sp}$ is the summation of the actual signal propagation times of the REQ and ACK frames, and TAT is the turn-around time (e.g., processing delay) of the STA.

Unfortunately, different make-and-models (and sometimes even same make-and-models) of STAs have different processing delays, and therefore it is difficult for an AP to accurately estimate the correct TAT for a given STA. Further complicating matters, the TAT for a given STA may vary over time, which may introduce additional errors in the calculated RTT value. Thus, because of the large value of c with respect to d, errors in the calculated value of RTT resulting from slight errors in the estimated TAT of the STA can lead to large errors in the calculated distance between the AP and the STA.

To avoid errors associated with estimating the STA's TAT, other WLAN positioning systems employ time difference of arrival (TDOA) techniques instead of RTT techniques to calculate the distances between its APs and the STA. For such systems, the STA broadcasts a data frame (e.g., a multicast frame), and each of a selected number of APs records the TOA of the data frame received by the AP. Then, differences in the measured TOA values at a multitude of APs can be used to calculate the position of the STA. Thus, because TDOA techniques call for the selected APs to record only TOA values (e.g., rather than calculating RTT values), STA positioning information calculated using TDOA techniques is not subject to errors associated with estimating the TAT of the STA.

However, the TOA values recorded by the selected APs are subject to errors resulting from multipath effects and/or from imperfect timing synchronization between the selected APs. Indeed, because each conventional TDOA measurement involves two different APs each measuring the TOA of a same data frame transmitted from the STA, even slight mismatches between the clocks of the two APs can lead to large errors in position determination. Unfortunately, providing highly accurate and tightly synchronized clocks in a plurality of APs is not only difficult but also very expensive.

Thus, it is desirable to improve the accuracy of WLAN positioning systems.

SUMMARY

A network based positioning (NBP) system is disclosed that improves the accuracy of wireless positioning systems by concurrently performing RTT ranging operations and associated TDOA operations to generate a number of difference measurement values from which the position of a station device (STA) can be determined using multilateration techniques. Each of the difference measurement values is generated by calculating the difference between an RTT value and a TDOA value for a corresponding ranging operation with the STA. Because the RTT values and their corresponding TDOA values both include the turn-around time (TAT) of the STA, subtracting TDOA values from their corresponding RTT values generates difference measurement values that do not include such TAT values of the STA. In this manner, STA positions determined in accordance with the present embodiments are not subject to errors associated with estimating the STA's TAT or subject to errors associated with the internal timing systems of the STA. As a result, the present embodiments allow the position of a STA to be determined with greater accuracy than conventional techniques described above.

In accordance with the present embodiments, the NBP system includes a server coupled to a plurality of APs that together form a wireless local area network (WLAN). Each AP forms a basic service set (BSS) that provides one or more associated STAs with access to one or more networks (e.g., LAN, intranet, the Internet, and so on) connected to the WLAN. To determine the position of a STA, the server instructs a number of first access points (APs) to initiate RTT ranging operations with the STA, and instructs a second AP to initiate a TDOA operation for each corresponding RTT operation. In response to the instructions, the first APs each initiate RTT ranging operations with the STA, and the second AP monitors the RTT ranging operations by performing TDOA operations on the data frames exchanged during ranging operations between the STA and each of the first APs. Thus, for the exemplary embodiments described herein, the first APs may be referred to as ranging access points, and the second AP may be referred to as the monitoring access point.

More specifically, each of the first APs transmits a request (REQ) frame (e.g., to the STA), which responds by transmitting an acknowledgement (ACK) frame (e.g., to the first AP).

In response thereto, the first AP calculates an RTT value of the exchanged REQ and ACK frames. Concurrently, the second AP receives both the REQ frame transmitted from the first AP and the ACK frame transmitted from the STA and, in accordance with the present embodiments, measures the time of arrival (TOA) of the REQ frame received at the second AP, and measures the TOA of the ACK frame received at the second AP. In response thereto, the second AP calculates a TDOA value indicative of a difference between the TOAs of the REQ and ACK frames received at the second AP.

Next, a difference measurement value is calculated for each pair of RTT and TDOA values, wherein each difference measurement value may be used to determine the difference in distances between the STA and the second AP and between the STA and a corresponding one of the first APs. More specifically, for some embodiments, each difference measurement value is generating by calculating the difference between a corresponding pair of RTT and TDOA values, and thereafter the range difference between a first distance separating the STA and the corresponding first AP and a second distance separating the STA and the second AP can be derived from the difference measurement value and the known distance separating the first AP and the second AP. Once the difference measurement values associated with 3 or more RTT ranging operations performed by a corresponding number of the first APs are calculated, the position of the STA can be determined using, for example, multilateration techniques.

BRIEF DESCRIPTION OF THE DRAWINGS

The present embodiments are illustrated by way of example and are not intended to be limited by the figures of the accompanying drawings, where.

DETAILED DESCRIPTION

The present embodiments are described below in the context of position determination operations performed by and between Wi-Fi enabled devices for simplicity only. It is to be understood that the present embodiments are equally applicable for performing position determination operations using signals of other various wireless standards or protocols. As used herein, the terms WLAN and Wi-Fi can include communications governed by the IEEE 802.11 standards, Bluetooth, HiperLAN (a set of wireless standards, comparable to the IEEE 802.11 standards, used primarily in Europe), and other technologies having relatively short radio propagation range. Further, the term "associated AP" refers to an AP of a WLAN that currently has an established communication channel or link with a STA within range of the WLAN, and the term "non-associated AP" refers to an AP of the WLAN that does not currently have an established communication channel or link with the STA.

In the following description, numerous specific details are set forth such as examples of specific components, circuits, and processes to provide a thorough understanding of the present disclosure. The term "coupled" as used herein means connected directly to or connected through one or more intervening components or circuits. Also, in the following description and for purposes of explanation, specific nomenclature is set forth to provide a thorough understanding of the present embodiments. However, it will be apparent to one skilled in the art that these specific details may not be required to practice the present embodiments. In other instances, well-known circuits and devices are shown in block diagram form to avoid obscuring the present disclosure. Any of the signals provided over various buses described herein may be time-multiplexed with other signals and provided over one or more common buses. Additionally, the interconnection between circuit elements or software blocks may be shown as buses or as single signal lines. Each of the buses may alternatively be a single signal line, and each of the single signal lines may alternatively be buses, and a single line or bus might represent any one or more of a myriad of physical or logical mechanisms for communication between components. The present embodiments are not to be construed as limited to specific examples described herein but rather to include within their scopes all embodiments defined by the appended claims.

Figure 1:
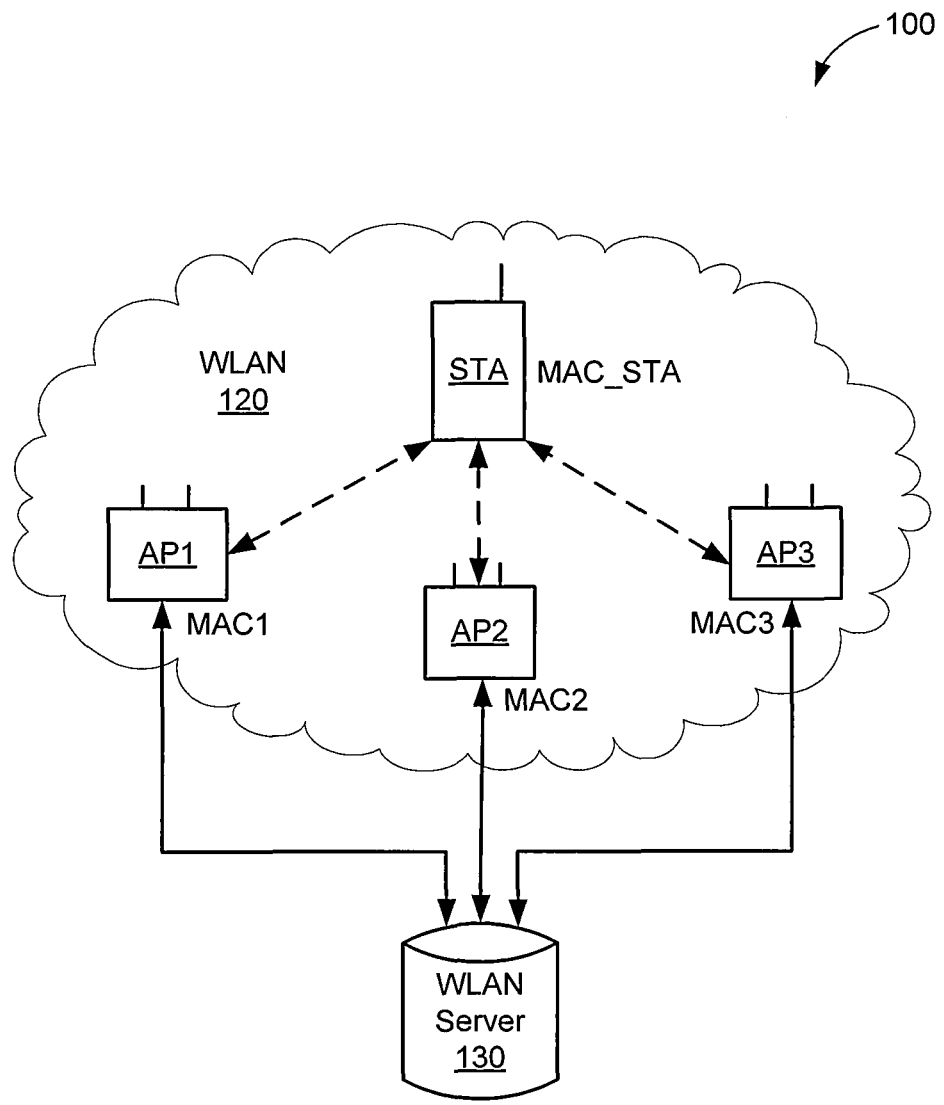
FIG. 1 is a block diagram of a network-based positioning (NBP) system within which the present embodiments can be implemented.

FIG. 1 is a block diagram of a network based positioning (NBP) system 100 in accordance with the present embodiments. The NBP system 100 is shown to include a wireless STA, a wireless local area network (WLAN) 120, and a WLAN server 130. The WLAN 120 is formed by a plurality of Wi-Fi access points (APs) that may operate according to the IEEE 802.11 family of standards (or according to other suitable wireless protocols). Although only three access points AP1-AP3 are shown in FIG. 1 for simplicity, it is to be understood that WLAN 120 can be formed by any number of access points. Each of access points AP1-AP3 is assigned a unique MAC address (i.e., MAC1-MAC3, respectively) that is programmed therein by, for example, the manufacturer of the access point. Similarly, the STA is also assigned a unique MAC address (MAC_STA). Each MAC address, which may be commonly referred to as the "burned-in address," the organizationally unique identifier (OUI), or the BSSID, in one embodiment includes six bytes (and thus 12 nibbles) of data. The first 3 bytes of the MAC address may identify which organization manufactured the device, and may be assigned to such organizations by the Institute of Electrical and Electronic Engineers (IEEE). The second 3 bytes of the MAC address, which may be referred to as the network interface controller (NIC) specific bytes, may be used to uniquely identify the individual device.

The WLAN server 130, which is coupled to AP1-AP3 over wired and/or wireless connections to control the operation of the APs, can instruct its APs to initiate concurrent RTT ranging and TDOA operations to accurately determine the position of the STA in a manner that eliminates errors associated with estimating STA turn-around times. More specifically, to determine the position of the STA, the WLAN server 130 can instruct a number of first APs to initiate RTT ranging operations with the STA, and can instruct a second AP to initiate a TDOA operation for each corresponding RTT operation. For each RTT ranging operation, a corresponding one of the first APs calculates an RTT value of the REQ and ACK frames exchanged with the STA, and the second AP calculates a TDOA value indicative of the difference between the TOA of the REQ frame at the second AP and the TOA of the ACK frame at the second AP. After receiving pairs of RTT and TDOA values from corresponding first APs and the second AP, respectively, the WLAN server 130 calculates a difference measurement value for each pair of RTT and TDOA values. Thereafter, the WLAN server 130 calculates the position of the STA from the difference measurement values and the known locations of the APs using, for example, multilateration techniques.

The STA can be any suitable Wi-Fi enabled wireless device including, for example, a cell phone, PDA, tablet computer, laptop computer, or the like. For the embodiments described herein, the STA may include radio frequency (RF) ranging circuitry (e.g., formed using well-known software modules, hardware components, and/or a suitable combination thereof) that can be used to estimate the distance between itself and one or more visible APs using suitable ranging techniques. For example, in some embodiments, the STA can use received signal strength indicator (RSSI) and/or round trip time (RTT) techniques to estimate the distance between itself and the access points AP1-AP3, for example, by correlating each RSSI or RTT value with a distance. In addition, the STA may include a local memory that stores a cache of Wi-Fi AP location data, and includes a processor that may execute WLAN positioning software, ranging software, and/or other suitable software.

Figure 2:
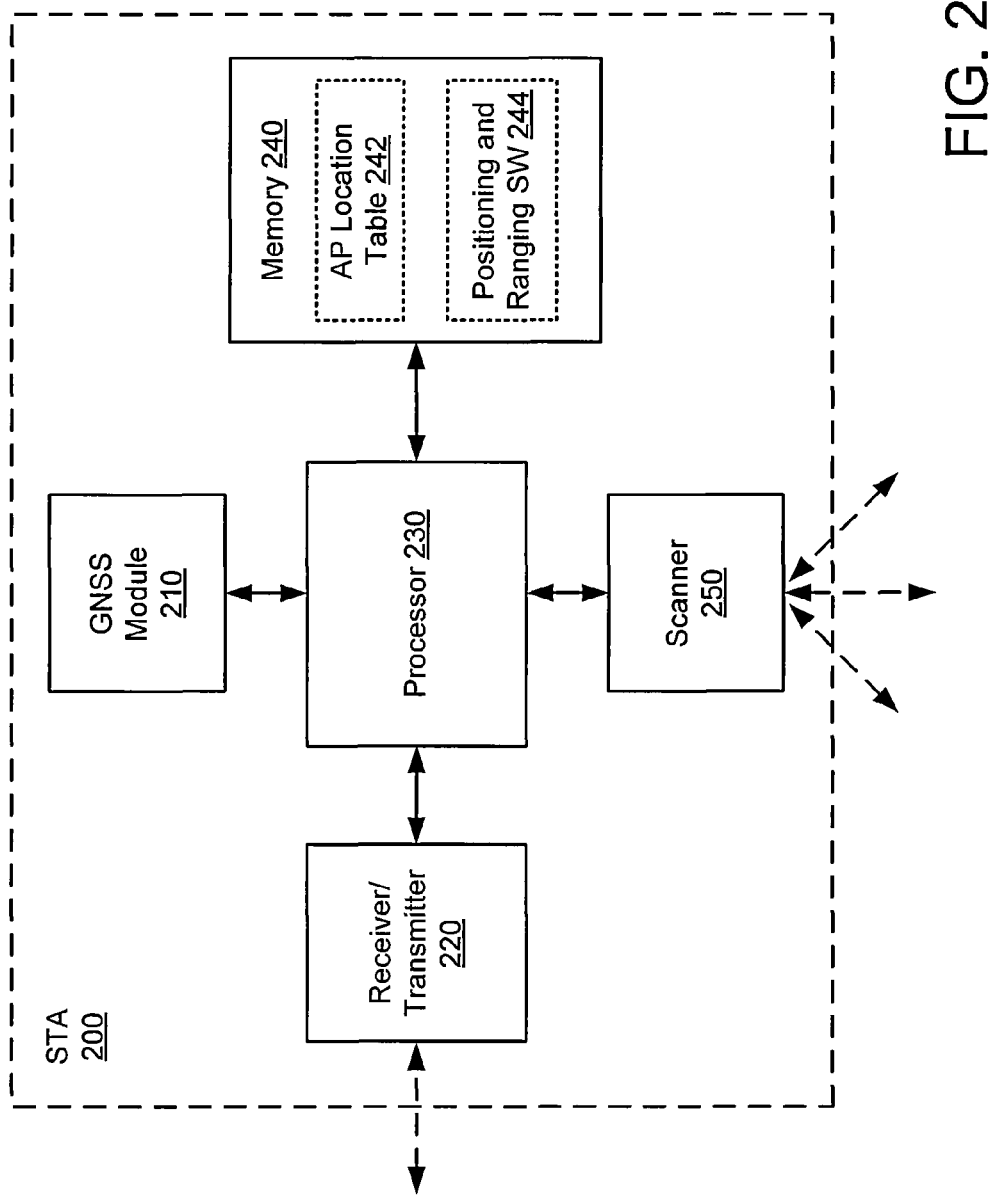
FIG. 2 is a block diagram of a wireless station (STA) in accordance with some embodiments.

FIG. 2 shows a STA 200 that is one embodiment of the STA of FIG. 1. The STA 200 includes a global navigation satellite system (GNSS) module 210, a transmitter/receiver circuit 220, a processor 230, a memory 240, and a scanner 250. The transmitter/receiver circuit 220 can be used to transmit signals to and receive signals from access points AP1-AP3 and/or other STAs. (see also FIG. 1). Scanner 250, which is well-known, can be used to scan the surrounding environment to detect and identify nearby APs (e.g., APs within range of STA 200). For some embodiments, the scanner 250 can search for nearby APs by periodically transmitting MAC address request frames. An AP within range of STA 200 receives one or more of the requests and responds by transmitting its MAC address to the STA 200. If the STA 200 has line-of-sight with a suitable number (e.g., 3 or more) of navigation satellites, the GNSS module 210 can determine the current location of the STA 200 using triangulation techniques, and can then provide the location information to processor 230 for storage in memory 240.

Memory 240 may include an AP location table 242 that can be used as a local cache to store the MAC addresses of a plurality of APs, the location coordinates of such APs, and other suitable location or configuration information of the APs. For some embodiments, each entry of the AP location table 242 includes an access point field to store the name of the associated AP, a BSSID field to store the MAC address of the AP, a coordinate field to store the location coordinates of the AP, and an uncertainty field to store a location uncertainty value for the AP.

Figure 6:
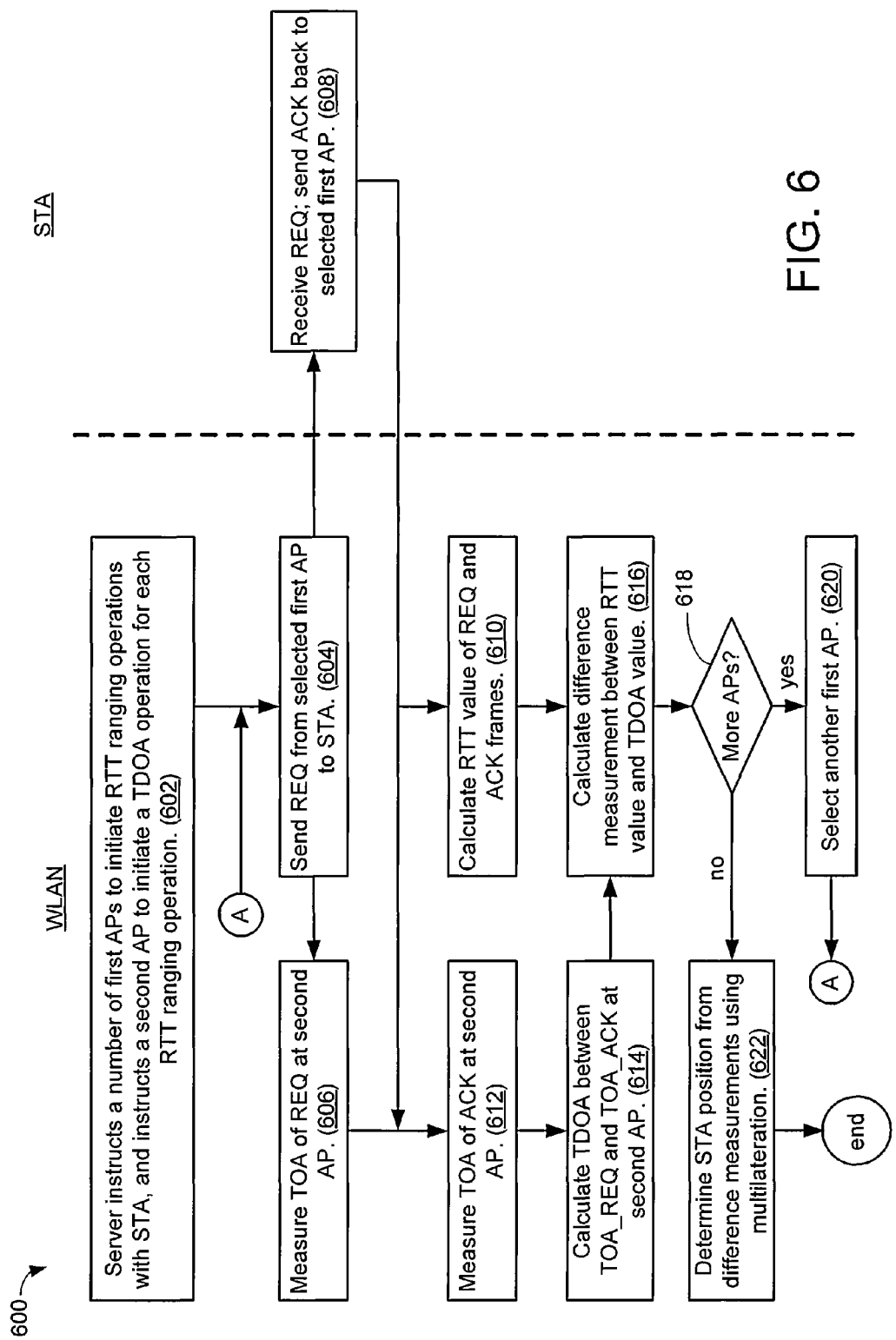
FIG. 6 is an illustrative flow chart depicting position determination operations in accordance with the present embodiments.

Memory 240 may also include a non-transitory computer-readable medium (e.g., one or more nonvolatile memory elements, such as EPROM, EEPROM, Flash memory, a hard drive, and so on) that can store the following software modules:
    a positioning and ranging software module 244 to determine the location of the STA based on locations of APs (e.g., using trilateration techniques) and/or to enable ranging operations with one or more APs of a corresponding WLAN (e.g., as described for operation 608 of FIG. 6).

Each software module can include instructions that, when executed by processor 230, can cause the STA 200 to perform the corresponding functions. Thus, the non-transitory computer-readable medium of memory 240 can include instructions for performing all or a portion of the station-side operations of method 600 of FIG. 6.

Processor 230, which is coupled to transmitter/receiver circuit 220, GNSS module 210, memory 240, and scanner 250, can be any suitable processor capable of executing scripts or instructions of one or more software programs stored in the STA 200 (e.g., within memory 240). For example, processor 230 can execute WLAN positioning and ranging software module 244 to determine the location of the STA 200 using nearby APs as reference points. For example, to determine the position of the STA 200, the precise locations of three selected APs (e.g., access points AP1-AP3) are first determined, either by accessing their location coordinates from location table 242, by retrieving their location coordinates from an access point location server (not shown for simplicity), or by parsing AP location information embedded within signals transmitted by the APs. Then, positioning and ranging software module 244 as executed by processor 230 can estimate the distance between the STA 200 and each of the selected APs using suitable RF ranging techniques (e.g., RSSI and/or RTT techniques), and thereafter can use the location coordinates of the selected APs and the estimated distances between them and the STA 200 to calculate the position of the STA 200. The positioning and ranging software module 244 can also be executed by processor 230 to initiate, respond to, and/or enable the STA 200 to perform or otherwise participate in ranging operations with the APs.

Figure 3:
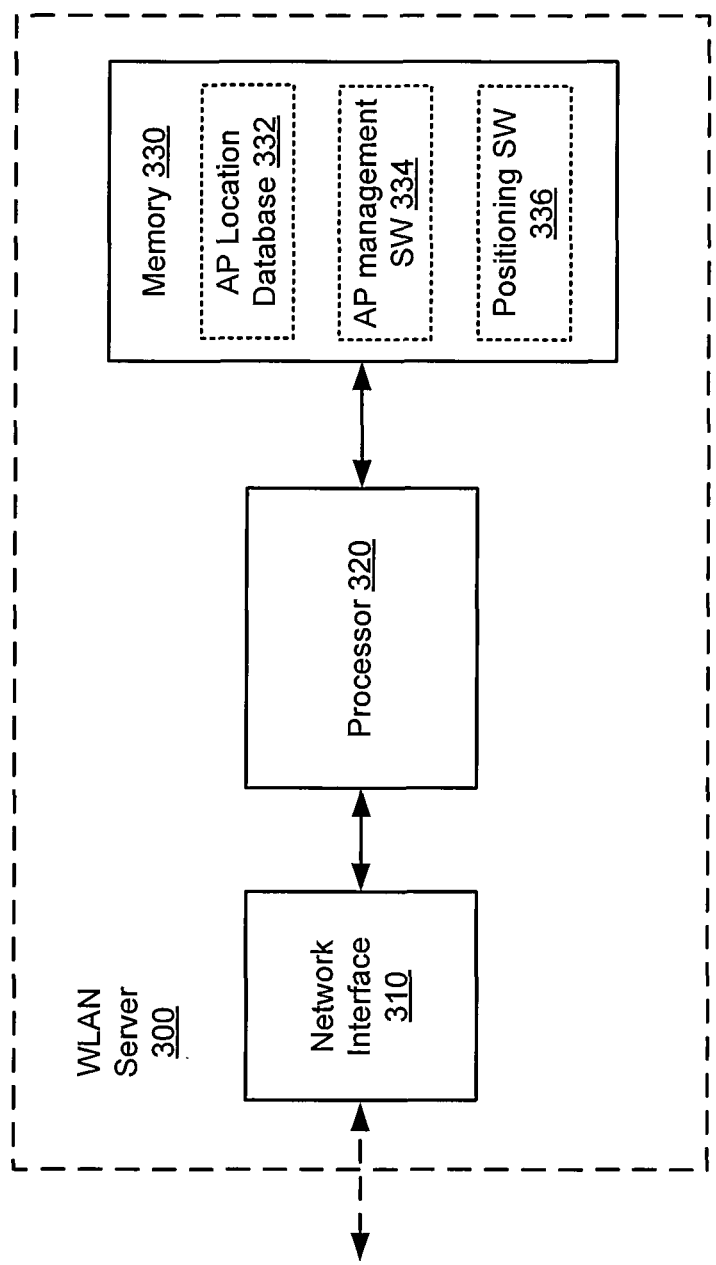
FIG. 3 is a block diagram of a WLAN server in accordance with some embodiments.

FIG. 3 shows a WLAN server 300 that is one embodiment of WLAN server 130 of FIG. 1. WLAN server 300 includes a network interface 310, a processor 320, and a memory 330. The network interface 310 can be used to communicate with APs associated with WLAN 120 (e.g., access points AP1-AP3) either directly or via one or more intervening networks and to transmit signals, and can be used to communicate with an associated distributed service (DS) network including, for example, a private LAN, a virtual LAN, an intranet, the Internet, and the like. Processor 320, which is coupled to network interface 310 and memory 330, can be any suitable processor capable of executing scripts or instructions of one or more software programs stored in WLAN server 300 (e.g., within memory 330).

Memory 330 includes an AP location database 332 that stores the MAC addresses (e.g., BSSIDs) of a plurality of APs, the location coordinates of such APs, and other suitable location or configuration information of the APs (e.g., the distances between each of the access points that form the corresponding WLAN 120). Memory 330 may also include a non-transitory computer-readable medium (e.g., one or more nonvolatile memory elements, such as EPROM, EEPROM, Flash memory, a hard drive, and so on) that can store the following software modules:
    AP management software module 334 to instruct a number of first APs to perform ranging operations with the STA and to instruct a second AP to concurrently perform TDOA operations in conjunction with the ranging operations performed by the first APs (e.g., as described for operations 602, 618, and 620 of FIG. 6); and
    a positioning software module 336 to calculate difference measurement values in response to pairs of RTT and TDOA values provided by the APs, and determine the location of the STA based on the known locations of the APs and the difference measurement values using, for example, multilateration techniques (e.g., as described for operations 616 and 622 of FIG. 6).

Each software module can include instructions that, when executed by processor 320, can cause the WLAN server 300 to perform the corresponding functions. Thus, the non-transitory computer-readable medium of memory 330 can include instructions for performing all or a portion of the server-side operations of method 600 of FIG. 6.

Processor 320, which is coupled to network interface 310 and memory 330, can be any suitable processor capable of executing scripts or instructions of one or more software programs stored in the WLAN server 300 (e.g., within memory 330). For example, processor 320 can execute AP management software module 334 and/or positioning software module 336.

Figure 4:
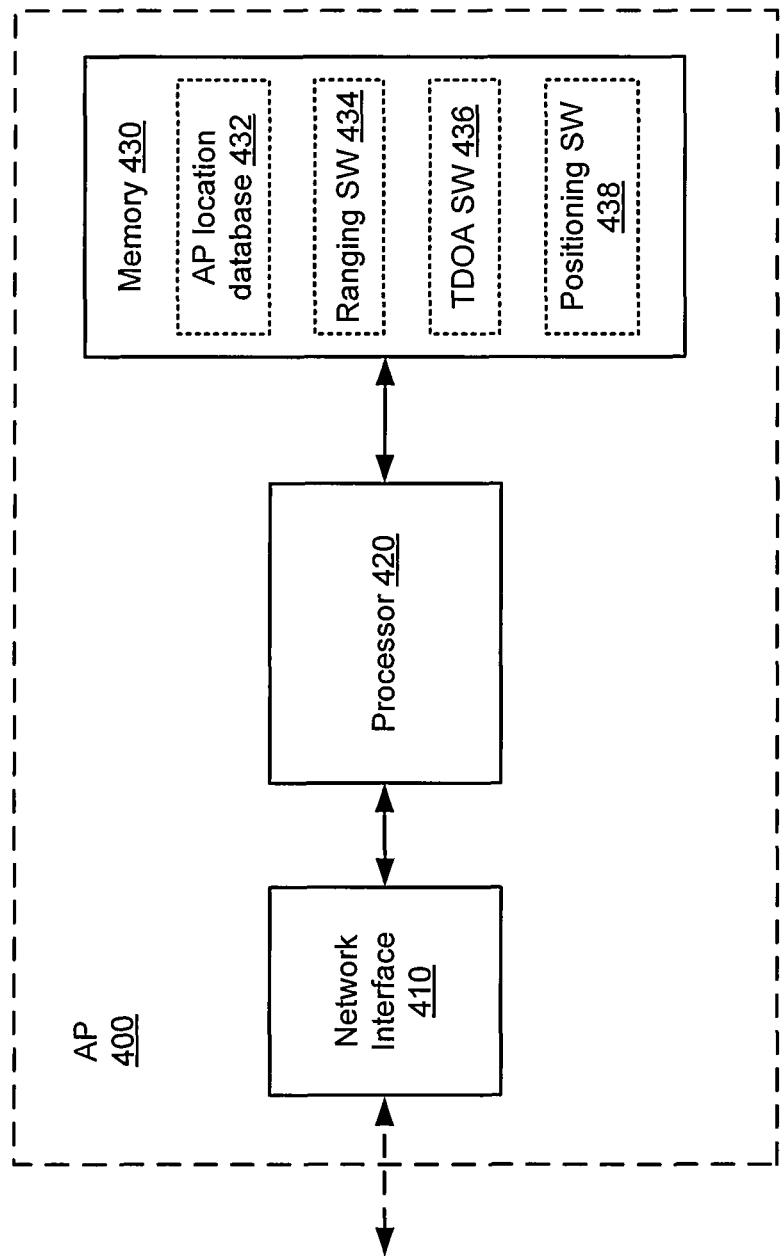
FIG. 4 is a block diagram of an access point (AP) in accordance with some embodiments.

FIG. 4 shows an AP 400 that is one embodiment of the access points AP1-AP3 of FIG. 1. AP 400 includes a network interface 410, a processor 420, and a memory 430. The network interface 410 can be used to communicate with WLAN server 300 of FIG. 3 either directly or via one or more intervening networks and to transmit signals. Processor 420, which is coupled to network interface 410 and memory 430, can be any suitable processor capable of executing scripts or instructions of one or more software programs stored in AP 400 (e.g., within memory 430).

Memory 430 includes an AP location database 432 that stores the MAC addresses (e.g., BSSIDs) of a plurality of APs, the location coordinates of such APs, and other suitable location or configuration information of the APs (e.g., the distances between AP 400 and other nearby APs). Memory 430 may also include a non-transitory computer-readable medium (e.g., one or more nonvolatile memory elements, such as EPROM, EEPROM, Flash memory, a hard drive, and so on) that can store the following software modules:

- a ranging software module 434 to initiate and perform ranging operations with one or more STAs and to calculate RTT values for such ranging operations (e.g., as described for operations 604 and 610 of FIG. 6);
- a TDOA software module 436 to initiate and perform TDOA operations in conjunction with RTT ranging operations performed by one or more other APs, and to calculate TDOA values for such operations (e.g., as described for operations 606, 612, and 614 of FIG. 6); and
- a positioning software module 438 to determine the location of the STA based on known locations of the APs and calculated distances between the STA and the APs (e.g., using trilateration techniques).

Each software module can include instructions that, when executed by processor 420, can cause the AP 400 to perform the corresponding functions. Thus, the non-transitory computer-readable medium of memory 430 can include instructions for performing all or a portion of the AP-side operations of method 600 of FIG. 6.

Processor 420, which is coupled to network interface 410 and memory 430, can be any suitable processor capable of executing scripts or instructions of one or more software programs stored in the AP 400 (e.g., within memory 430). For example, processor 420 can execute ranging software module 434, TDOA software module 436, and/or positioning software module 438.

Figure 5A:
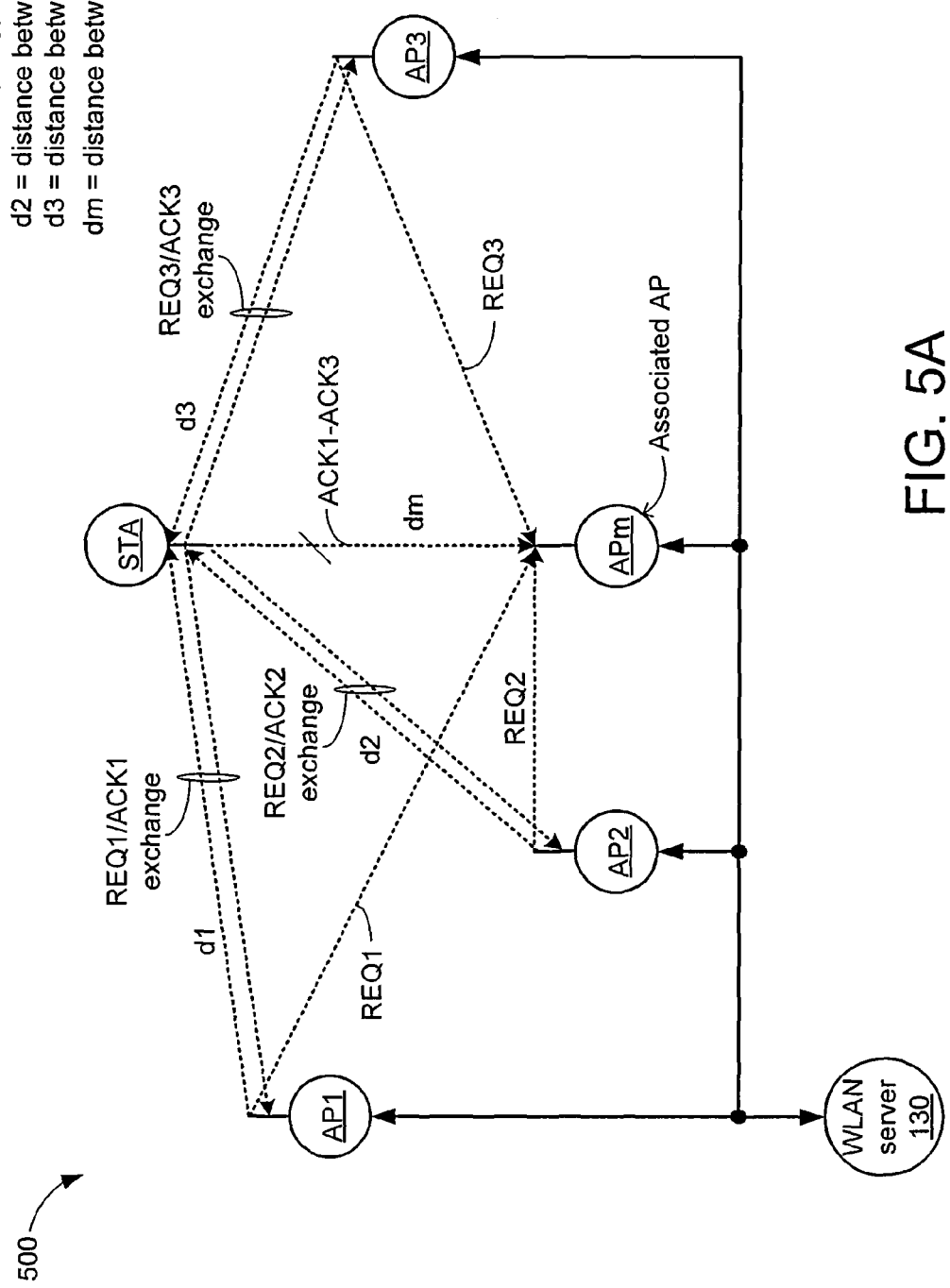
FIG. 5A is a signal exchange diagram depicting an exemplary position determination operation performed by the NBP system of FIG. 1 in accordance with some embodiments.
Figure 5B:
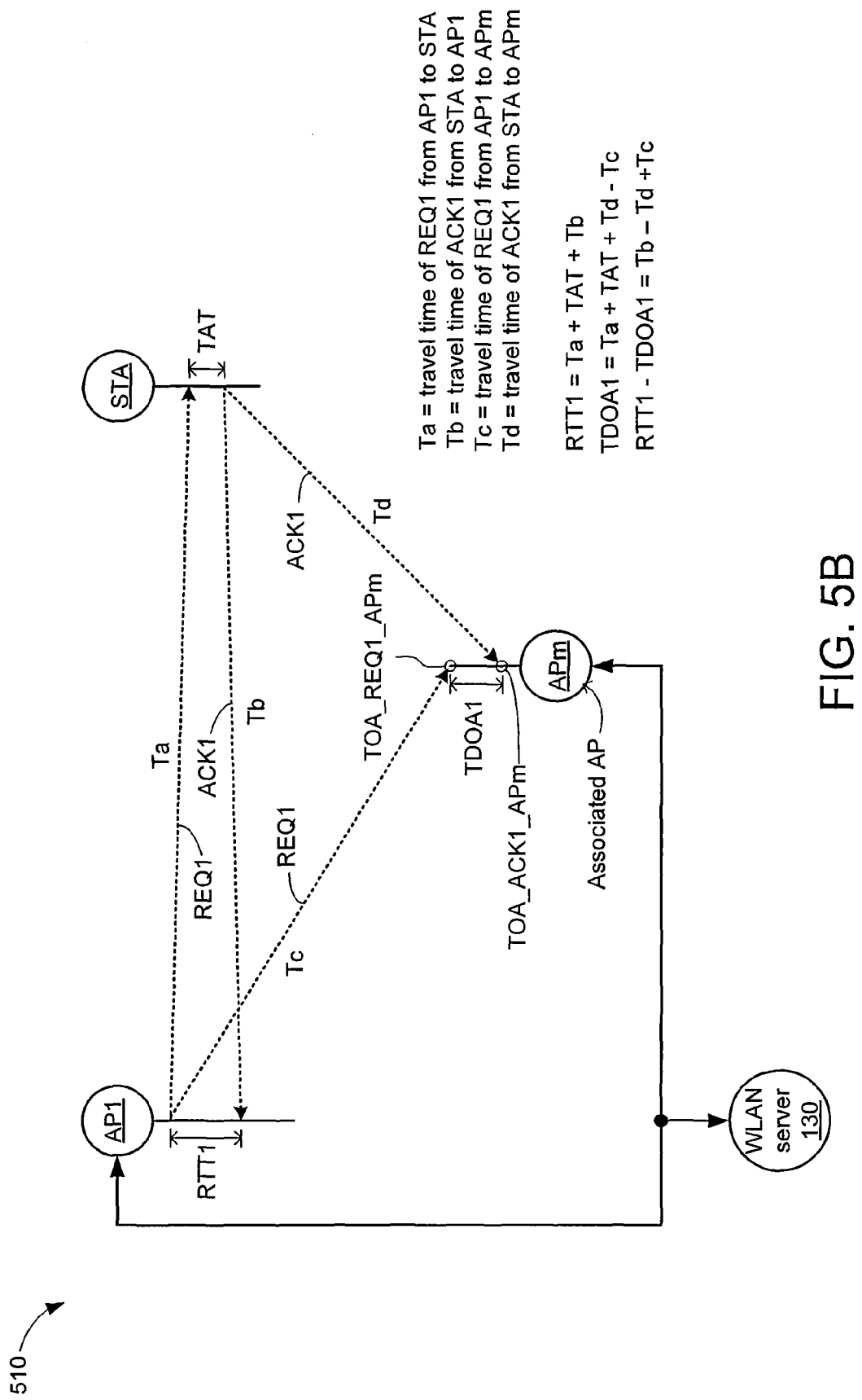
FIG. 5B is a sequence diagram depicting a portion of the position determination operation of FIG. 5A in accordance with some embodiments.

An exemplary position determination operation performed by the NBP system 100 of FIG. 1 is depicted in the signal exchange diagram 500 of FIG. 5A and in the sequence diagram 510 of FIG. 5B. As shown in FIG. 5A, WLAN server 130 is coupled to and controls the operation of access points AP1-AP3 and access point APm, which together form a WLAN such as the WLAN 120 of FIG. 1. For the exemplary diagram 500 of FIG. 5A, the STA is currently associated with APm (e.g., the STA has an established wireless connection with AP1), and is not currently associated with AP1, AP2, or AP3. Further, for purposes of discussion herein, access points AP1-AP3 perform RTT ranging operations with the STA, and access point APm monitors those RTT ranging operations by performing TDOA operations on the REQ/ACK signal exchanges between the STA and each of AP1-AP3. Thus, access points AP1-AP3 may be referred to herein as "ranging" access points, and access point APm may be referred to herein as the "monitoring" access point. It is noted that because APm is associated with the STA (e.g., and is therefore operating on the same channel as the STA), the monitoring access point APm receives all REQ frames transmitted from the ranging access points AP1-AP3, and also receives all ACK frames transmitted from the STA in response to the REQ frames.

In accordance with the present embodiments, the WLAN server 130 can initiate operations to determine the position of the STA by instructing the ranging access points AP1-AP3 to perform RTT ranging operations with the STA, and by instructing the monitoring access point APm to perform TDOA operations on the REQ/ACK signal exchanges associated with the ranging operations performed by the ranging access points AP1-AP3. Upon receiving the ranging instructions, each of the ranging access points AP1-AP3 can initiate a corresponding RTT ranging operation with the STA by sending a corresponding REQ frame to the STA, which in turn sends an ACK frame back to the AP. Each of the ranging access points AP1-AP3 can then calculate the RTT value of the corresponding exchange of REQ/ACK frames with the STA.

More specifically, a given ranging access point APi can calculate the RTT value as the difference between the time of arrival (TOA) of the corresponding ACK frame at the ranging AP and the time of departure (TOD) of the REQ frame from the ranging AP (e.g., $RTT_i = TOA\_ACK_i\_AP_i - TOD\_REQ_i$, where i denotes one of the ranging access points AP1-AP3). The distance (d) between the ranging access point and the STA can be determined from the RTT value using the expression $d = (RTT - TAT)c/2$, where c is the speed of light and TAT is the STA's turn-around time or processing delay (e.g., as estimated by the ranging AP). Note that the difference value of RTT−TAT indicates the actual signal propagation times of the REQ and ACK frames.

For example, AP1 can range STA by sending REQ1 to STA, which in response thereto sends ACK1 back to AP1. Then, AP1 can calculate a first RTT value indicative of the distance (d1) between AP1 and the STA as $RTT1 = TOA\_ACK1\_AP1 - TOD\_REQ1$. Similarly, AP2 can range STA by sending REQ2 to STA, which in response thereto sends ACK2 back to AP2. Then, AP2 can calculate a second RTT value indicative of the distance (d2) between AP2 and the STA as $RTT2 = TOA\_ACK2\_AP2 - TOD\_REQ2$. Similarly, AP3 can range STA by sending REQ3 to STA, which in response thereto sends ACK3 back to AP3. Then, AP3 can calculate a third RTT value indicative of the distance (d3) between AP3 and the STA as $RTT3 = TOA\_ACK3\_AP3 - TOD\_REQ3$.

Upon completion of the ranging operations, access points AP1-AP3 can send the calculated RTT values to the WLAN server 130. For other embodiments, one or more of AP1-AP3 can send its ranging measurements (e.g., TOD/TOA information associated with the REQ/ACK frame exchange) to the WLAN server 130, which in turn can calculate the RTT values (and may optionally correlate the RTT value to a distance).

For some embodiments, the REQ frame is a probe signal such as a NULL frame or a QoS NULL frame. For other embodiments, the REQ frame can be any frame that elicits a response from the STA (e.g., a clear-to-send (CTS) frame).

In response to the TDOA monitoring instruction, access point APm monitors the RTT ranging operations performed by the ranging access points AP1-AP3, and calculates a TDOA value for each pair of REQ and ACK frames exchanged between the STA and a corresponding one of the ranging access points AP1-AP3. As mentioned above, because the monitoring access point APm is associated with the STA, APm receives the request frames REQ1-REQ3 sent to the STA from respective ranging access points AP1-AP3, and also receives the acknowledgement frames ACK1-ACK3 sent from the STA to respective access points AP1-AP3. Thus, in accordance with the present embodiments, for each pair of REQ and ACK frames exchanged between the STA and a given one of the ranging access points AP1-AP3, the monitoring access point APm measures the TOA of REQ frame received at APm, measures the TOA of the ACK frame received at APm, and then calculates a corresponding TDOA value as TDOA=TOA_ACK_APm−TOA_REQ_APm.

For example, APm can calculate a first TDOA value as TDOA1=TOA_ACK1_APm−TOA_REQ1_APm, where TDOA1 may indicate the difference in distances between STA and AP1 and between STA and APm (e.g., TDOA1 may be indicative of d1-dm). Similarly, APm can calculate a second TDOA value as TDOA2=TOA_ACK2_APm−TOA_REQ2_APm, where TDOA2 may indicate the difference in distances between STA and AP2 and between STA and APm (e.g., TDOA2 may be indicative of d2-dm). Similarly, APm can calculate a third TDOA value as TDOA3=TOA_ACK3_APm−TOA_REQ3_APm, where TDOA3 may indicate the difference in distances between STA and AP3 and between STA and APm (e.g., TDOA3 may be indicative of d3-dm).

Upon completion of the TDOA operations, monitoring access point APm sends the calculated TDOA values to the WLAN server 130. For other embodiments, APm can send its measured TOA values to the WLAN server 130, which in turn can calculate the TDOA values.

Once the WLAN server 130 obtains the values RTT1-RTT3 from respective ranging access points AP1-AP3 and receives the values TDOA1-TDOA3 from the monitoring access point APm, the WLAN server 130 can generate a difference measurement (M) value corresponding to each RTT ranging operation by calculating the difference between corresponding pairs of RTT and TDOA values. For example, WLAN server 130 can calculate a first difference measurement value M1=RTT1−TDOA1 that indicates the difference in distances between the STA and AP1 and between the STA and APm, WLAN server 130 can calculate a second difference measurement value M2=RTT2−TDOA2 that indicates the difference in distances between the STA and AP2 and between the STA and APm, and WLAN server 130 can calculate a third difference measurement value M3=RTT3−TDOA3 that indicates the difference in distances between the STA and AP3 and between the STA and APm. Thereafter, the difference measurement values M1-M3 can be used to accurately determine the position of the STA using, for example, multilateration techniques. By using difference measurement values generated using both RTT and TDOA values to determine the STA position, the present embodiments can advantageously eliminate errors associated with estimating the TAT of the STA when determining the position of the STA, as explained in more detail below with respect to FIG. 5B. Indeed, because the STA's TAT is typically estimated by the ranging AP and may vary over time, eliminating the TAT from position determination operations can significantly increase the accuracy with which the STA's position is calculated.

FIG. 5B is a sequence diagram depicting a portion of the position determination operation of FIG. 5A, with time indicated in the vertical direction. More specifically, FIG. 5B illustrates the exchange of REQ1/ACK1 frames between the STA and AP1 associated with AP1's calculation of RTT1 between the STA and AP1, the measurement of the TOAs of the REQ1 and ACK1 frames at APm, and the subsequent calculation of the TDOA1 value by access point APm. In operation, AP1 ranges the STA by sending REQ1 to STA, which in response thereto sends ACK1 to AP1. Then, AP1 calculates RTT1=TOA_ACK1_AP1−TOD_REQ1, where RTT1 is indicative of the distance d1 between the STA and AP1. While AP1 is performing the ranging operation with the STA, APm measures the TOA of REQ1 at APm as TOA_REQ1_APm and measures the TOA of ACK1 at APm as TOA_ACK1_APm. Then, APm calculates TDOA1=TOA_ACK1_APm−TOA_REQ1_APm.

After the WLAN server 130 receives RTT1 and TDOA1 from AP1 and APm, respectively, the WLAN server 130 can calculate the difference measurement value M1=RTT1−TDOA1. More specifically, if we denote Ta as the signal propagation time of REQ1 from AP1 to STA, TAT as the turn-around time of the STA, Tb as the signal propagation time of ACK1 from STA to AP1, Tc as the signal propagation time of REQ1 from AP1 to APm, and Td as the signal propagation time of ACK1 from STA to APm, then RTT1 may be expressed as:

$$\text{RTT1} = \text{TOA}_{ACK1,AP1} - \text{TOD}_{REQ1,AP1} = Ta + \text{TAT} + Tb, \quad (1)$$

TDOA1 may be expressed as:

$$\text{TDOA1} = \text{TOA}_{ACK1,APm} - \text{TOA}_{REQ1,APm} = Ta + \text{TAT} + Td - Tc, \quad (2)$$

and M1 may be expressed as:

$$M1 = \text{RTT1} - \text{TDOA1} = Tb - Td + Tc. \quad (3)$$

Equation (3) can be re-arranged to calculate the difference between the propagation time of ACK1 from STA to APm and the propagation time of ACK1 from STA to AP1 as:

$$Td - Tb = \text{TDOA1} - \text{RTT1} + Tc \quad (4)$$

The difference in distances between the STA and APm and between the STA and AP1 may therefore be expressed as the range difference:

$$R1 = Rd - Rb = (c*\text{TDOA1}) - (c*\text{RTT1}) + (c*Tc), \quad (5)$$

where Rd is the range (i.e., distance) between the STA and APm, and Rb is the range between the STA and AP1. Note that the parameter c*Tc=Rc, where Rc is the range between AP1 and APm. Because the positions of AP1 and APm are known, the value for Rc=c*Tc is also known (e.g., which may be stored in memory within WLAN server 130). Accordingly, the range difference R1=Rd−Rb may be derived using the RTT1 value calculated by AP1, the TDOA1 value calculated by APm, and the known distance Rc between AP1 and APm.

The process described above with respect to FIG. 5B can be repeated in a similar manner for the other ranging access points AP2 and AP3 to calculate the difference measurement values M2 and M3, where M2 is indicative of the difference in ranges between the STA and APm and between the STA and AP2, and where M3 is indicative of the difference in ranges between the STA and APm and between the STA and AP3.

Subsequently, after the WLAN server 130 has calculated the three difference measurement values M1-M3, the WLAN server 130 can determine the position of the STA from M1-M3 and the known locations of AP1-AP3 and APm using, for example, multilateration techniques. In this manner, the present embodiments advantageously allow the position of the STA to be calculated without estimating the TAT of the STA and without maintaining precise clock synchronization between all participating access points.

Note that for the exemplary embodiments described herein, the propagation times of signals in the transmit and receive chains within the access points are ignored for simplicity. For actual embodiments, these propagation times, which are known to the access points (e.g., by testing propagation delays within such transmit and receive chains), may be included in the calculations described above with respect to equations (1) through (5).

FIG. 6 is a flowchart illustrating a method 600 for performing position determination operations in accordance with the present embodiments. Referring also to FIGS. 1, 5A, and 5B, in the method 600, the WLAN server 130 instructs a number of first access points (e.g., AP1-AP3) to initiate RTT ranging operations with the STA, and instructs a second access point (e.g., APm) to initiate a TDOA operation for each corresponding RTT operation (602). In response to the instructions, a selected one of the first APs sends a REQ frame to the STA (604), which is received by both the STA and the second AP. In response to receiving the REQ frame, the second AP measures the TOA of the REQ frame received therein (606), and the STA sends an ACK frame to the selected first AP (608). The ACK frame is received by both the selected first AP and the second AP. In response thereto, the selected first AP calculates the RTT value of the exchanged REQ and ACK frames (610), and the second AP measures the TOA of the ACK frame received therein (612). The second AP then calculates a TDOA value between the TOA of the REQ frame at the second AP and the TOA of the ACK frame at the second AP (614).

Then, after receiving the RTT value from the selected first AP and receiving the TDOA value from the second AP, the WLAN server 130 calculates a difference measurement value (M) using the RTT and TDOA values (616). As described above, the difference measurement value (M) is indicative of a difference in distances between the STA and the selected first access point and the between the STA and the second access point.

If more of the first access points have yet to perform RTT ranging operations, as tested at 618, then another one of the first access points is selected (620), and processing continues at 604. Otherwise, if all of the first access points have performed their RTT ranging operations in conjunction with concurrent TDOA operations performed by the second access point, as tested at 618, then the WLAN server 130 uses the difference measurement values and the known locations of the first and second APs to determine the position of the STA using, for example, multilateration techniques (622).

In the foregoing specification, the present embodiments have been described with reference to specific exemplary embodiments thereof. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. For example, method steps depicted in the flow charts of FIG. 6A-6D can be performed in other suitable orders and/or one or more methods steps may be omitted. In addition, although described above in the context of RTT ranging operations, the present embodiments are equally applicable to other types of ranging operations (e.g., RSSI and/or TDOA ranging techniques).

What is claimed is:

1. A method of determining a position of a wireless station (STA), the method comprising:
exchanging a request (REQ) frame and an acknowledgement (ACK) frame between a first access point (AP) and the STA;
determining, in the first AP, a round trip time (RTT) value in response to exchanging the REQ frame and the ACK frame between the first AP and the STA;
determining a time of arrival (TOA) of the REQ frame at a second AP and a TOA of the ACK frame at the second AP;
determining a time difference of arrival (TDOA) value indicative of the difference between the TOA of the ACK frame and the TOA of the REQ frame; and
determining a difference measurement value indicative of a difference between the RTT value and the TDOA value, wherein the first AP and the STA are separated by a first distance, the second AP and the STA are separated by a second distance, and the difference measurement value indicates a difference between the first and the second distances.

2. The method of claim 1, wherein the exchanging is initiated by the first AP.

3. The method of claim 1, wherein a server coupled to the APs instructs the first AP to determine the RTT value and the second AP to determine the TDOA value concurrently.

4. The method of claim 1, wherein the first AP is not associated with the STA, and the second AP is associated with the STA.

5. The method of claim 1, wherein the distance measurement value is determined by a server coupled to the first AP and the second AP.

6. The method of claim 1, further comprising:
determining the position of the STA based, at least in part, on the difference measurement value and a known distance between the first AP and the second AP.

7. A wireless positioning system having a plurality of access points (APs) for determining a position of a wireless station (STA), the system comprising:
means for exchanging a request (REQ) frame and an acknowledgement (ACK) frame between a first AP and the STA;
means for determining a round trip time (RTT) value in response to exchanging the REQ frame and the ACK frame between the first AP and the STA;
means for determining a time of arrival (TOA) of the REQ frame at a second AP and a TOA of the ACK frame at the second AP;
means for determining a time difference of arrival (TDOA) value indicative of the difference between the TOA of the ACK frame and the TOA of the REQ frame; and
means for determining a difference measurement value indicative of a difference between the RTT value and the TDOA value, wherein the first AP and the STA are separated by a first distance, the second AP and the STA are separated by a second distance, and the difference measurement value indicates a difference between the first and the second distances.

8. The system of claim 7, wherein the means for exchanging resides within the first AP.

9. The system of claim 7, wherein the means for determining the RTT value resides within the first AP, and the means for determining the TDOA value resides within the second AP.

10. The system of claim 7, wherein the first AP determines the RTT value and the second AP determines the TDOA value concurrently, in response to instructions from a server coupled to the APs.

11. The system of claim 7, wherein the first AP is not associated with the STA, and the second AP is associated with the STA.

12. The system of claim 7, further comprising:

means for determining the position of the STA based, at least in part, on the difference measurement value and a known distance between the first AP and the second AP.

13. A wireless positioning system for determining a position of a wireless station (STA), the system comprising:

a first access point (AP) to perform a round trip time (RTT) ranging operation between the first AP and the STA, wherein the RTT ranging operation is to determine an RTT value in response to an exchange of a request (REQ) frame and an acknowledgement (ACK) frame between the first AP and the STA;

a second AP to perform a time difference of arrival (TDOA) operation concurrently with the RTT ranging operation, wherein the TDOA operation determines a TDOA value corresponding to the REQ and ACK frames exchanged by the first AP and the STA received at the second AP; and a server, coupled to the first and second APs, to determine a difference measurement value indicative of the difference between the RTT value and the TDOA value, wherein the first AP and the STA are separated by a first distance, the second AP and the STA are separated by a second distance, and the difference measurement value indicates a difference between the first and the second distances.

14. The system of claim 13, wherein the second AP is to determine a time difference between a time of arrival (TOA) of the REQ frame at the second AP and a TOA of the ACK frame at the second AP.

15. The system of claim 13, wherein the server is to instruct the first AP to determine the RTT value and to instruct the second AP to determine the TDOA value.

16. The system of claim 13, wherein the first AP is not associated with the STA, and the second AP is associated with the STA.

17. The system of claim 13, wherein the server is to determine the position of the STA from the difference measurement value and a known distance between the first AP and the second AP.

* * * * *